Patented July 29, 1952

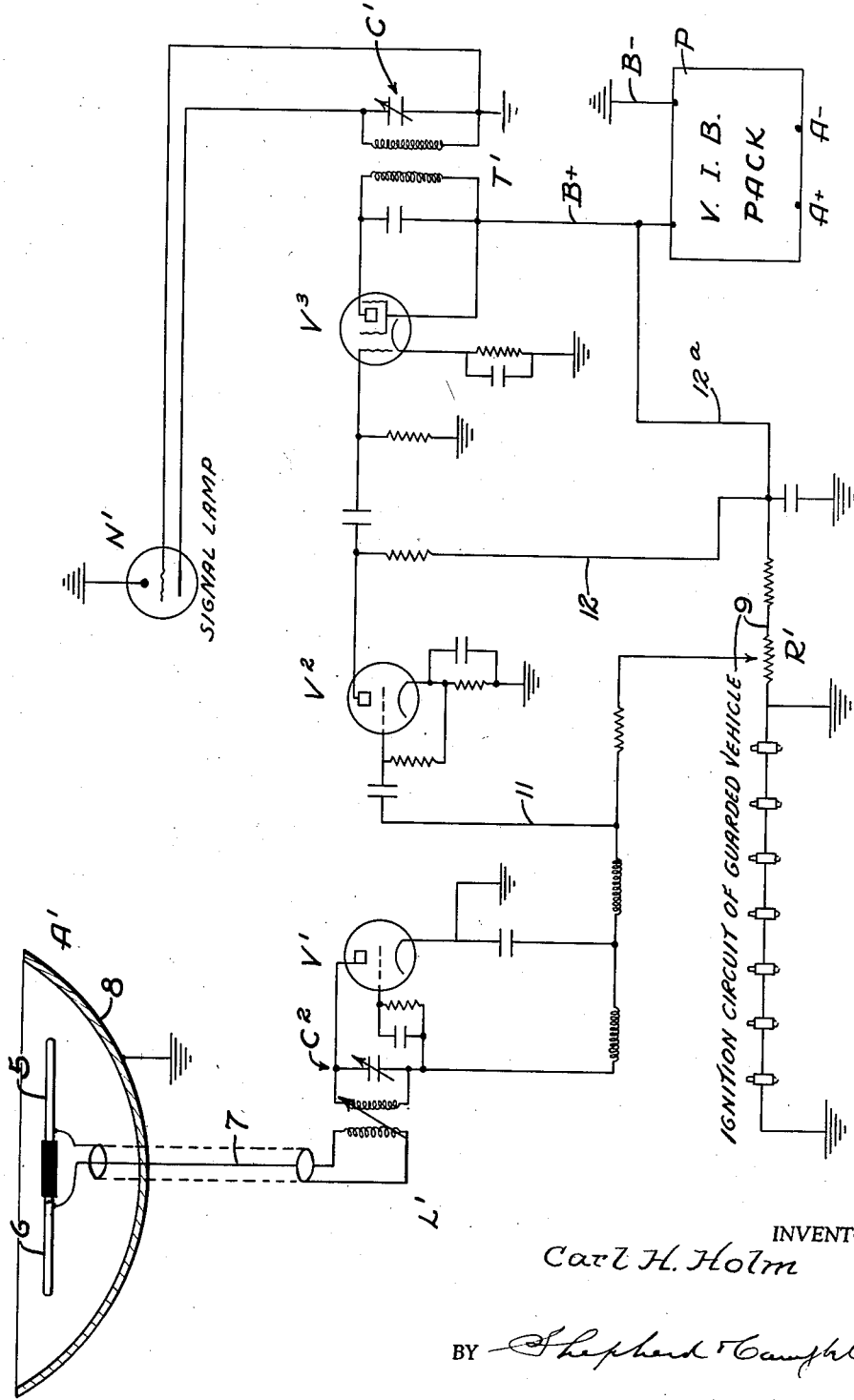

2,605,393

UNITED STATES PATENT OFFICE 2,605,393

METHOD OF AND MEANS FOR PREVENTING COLLISION BETWEEN MOVING VEHICLES

Carl H. Holm, Honolulu, Territory of Hawaii

Application October 18, 1949, Serial No. 122,042

2 Claims. (Cl. 250—1)

This invention relates to a method of and means for preventing collisions between moving vehicles. While the principles and apparatus employed are applicable to boats, aircraft and the like the invention is of particularly great utility in conjunction with automobiles and will be described in that relation.

Many serious automobile accidents are caused daily by drivers getting over on the left side of the road on curves or on hills where a view of the road ahead cannot be had and it is a primary purpose of the present invention to set up on an automobile a signal which is created by the presence of an oncoming vehicle. This signal will not only indicate the presence of such oncoming vehicle but will, by its action, indicate the proximity and rate of approach of such oncoming vehicles. Thus, where each of two vehicles, approaching from opposite directions around a curve, is equipped with the device of this invention, each driver will be warned of the approach of the other before they come within sight of each other and each will be warned to keep well to the right side of the road.

I am aware of the fact that it is not new to provide each of two vehicles with means to send and receive electronic signals for the purpose of indicating to the operators of each, the presence of the other.

However certain practical difficulties exist in the use of devices of that sort upon automobiles because while one driver may have his vehicle equipped with the necessary special apparatus the other driver may fail to so equip his car and thus the apparatus of the equipped car is useless. The present invention, therefore, resides in the provision of novel apparatus adapted to meet the conditions of present day traffic and it will be best understood by reference to the accompanying drawing the figure of which is a diagrammatic layout of apparatus adapted to carry out the invention. Briefly stated, the invention contemplates utilizing the high frequency emanations or electrical waves from the ignition system of an approaching vehicle to heterodyne with the like impulses from the ignition system of the vehicle carrying the apparatus to get a current of a frequency differing from the spark plug frequencies of both vehicles and which current is susceptible of amplification and use as a signal to indicate the presence of the remote vehicle.

The single figure of the drawing shows an embodiment of my invention.

It is common practice in television and radar practice to provide directional and shielded antennae consisting of a dipole antenna and a reflector disposed therebehind. This prevents electrical impulses from behind from impinging upon the bars or poles of the antenna proper. In the drawing I have diagrammatically indicated such an antenna at A. Here the numerals 5 and 6 indicate the poles to which the ends of a coaxial cable 7 are connected. The shielding reflector is indicated at 8. The leads of the coaxial cable deliver the imposed impulses to conventional amplification units such as those commonly employed in the radio field. The first stage of amplification at V1 is of the impulses received at the antenna A and these impulses are caused to heterodyne with high frequency impulses in the ignition circuit of the equipped automobile which circuit is indicated at 9 and includes a potentiometer R1 for adjusting the sensitivity of the receiver as a whole with respect to the output from circuit 9. The resulting current in the circuit comprising the leads 11 and 12 and the amplification units V2, V3 is then amplified by said units and utilized to flash a gas discharge tube N1 constituting a signal lamp. The strength of the signal delivered to the antenna and consequently the distance away of the vehicle from which it emanates is indicated by the frequency of flashing of tube N1. This frequency of flashing is adjusted by means of the condenser C1. A lead 12a connecting the power pack to the lead 12 provides means for supplying current to the plate of amplification unit V2. Current to the plate of amplification unit V1 is delivered through 12a, the two chokes and the tuning coil shown. The potentiometer R1 having as shown, one terminal grounded, controls the sensitivity by controlling the voltage at the plate of V1.

At L1 it is indicated that the circuit there is a tuned one and that it can be adjusted to secure maximum transfer of energy from antenna A. A small power pack is indicated at P and comprises the conventional A+ A— and B+ B— terminals for energization of the several amplification tubes in the usual way.

The flashing tube N1 may be exposed to view of the driver and thus serve as a visual signal indicating the approach of another automobile.

In traveling upon city streets the antenna may be directed to say an angle of 45° to the right of the line of travel of the protected automobile so that the driver of an automobile traveling north will be apprised of the approach of vehicles from the east on narrow streets, long before the driver could see such vehicles.

Emphasis is placed upon the fact that by virtue of the method described the current delivered to the flashing tube may be made so different, as to frequency, as to permit the complete tuning out of the signal or flashing tube circuit, of the frequencies common to the spark plug circuits of both vehicles. Thus interference by the spark plug circuit frequencies of the equipped vehicle, with the signal circuit, is prevented.

For convenience in distinguishing between the vehicles, the vehicle equipped with the apparatus of my invention will be referred to in the claims as the guarded vehicle and the other vehicle will be referred to as the approaching vehicle.

It is to be understood that the invention is not limited to the precise construction set forth but that it includes within its purview whatever changes fairly come within either the terms or the spirit of the appended claims.

What I claim is:

1. In signaling apparatus of the character described, a directional antenna carried by a guarded vehicle, amplification means for amplifying high frequency impulses received upon the antenna from the ignition system of an approaching vehicle, a signal element responsive to high frequency impulses delivered thereto from the amplifying means and means for modifying the impulses delivered to the signal element by the action of the ignition circuit of the guarded vehicle so that the frequencies of the signal circuit will be different from those of the ignition circuit of the guarded vehicle.

2. Means for preventing collisions between a guarded automobile and an approaching automobile consisting of a detecting antenna upon the guarded automobile adapted to pick up the high frequency emanations from the spark plugs of the approaching automobile, means for amplifying the emanations picked up by said antenna, means for heterodyning said picked up amplified emanations with the high frequency electrical emanations from the spark plugs of the guarded automobile to secure a high frequency current differing in frequency from the emanations sent forth from the spark plugs of the guarded and approaching automobiles, a visual electrical signal comprising a gas filled tube and connections to said visual signal for supplying the heterodyned current thereto said connections including a condenser functioning to cause the gas tube to flash at a rate and with a strength proportional to the strength of the heterodyned current which strength in turn varies with the proximity of the said two automobiles.

CARL H. HOLM.

REFERENCES CITED

The following references are of record in the file of this patent:

UNITED STATES PATENTS

| Number | Name | Date |
|---|---|---|
| 1,907,471 | Alexanderson | May 9, 1933 |
| 2,034,616 | Gossler | Mar. 17, 1936 |
| 2,224,678 | Hathaway | Dec. 10, 1940 |